United States Patent Office 3,119,854
Patented Jan. 28, 1964

3,119,854
METHOD OF SEPARATING ALUMINUM TRI-
ETHYL FROM OTHER METAL ETHYL COM-
POUNDS AND TO A NOVEL ALUMINUM
COMPLEX COMPOUND
Karl Ziegler, 1 Kaiser Wilhelm Platz, Mulheim an der
Ruhr, and Herbert Lehmkuhl, Mulheim an der Ruhr,
Germany; said Lehmkuhl assignor to said Ziegler
No Drawing. Filed July 1, 1960, Ser. No. 40,135
Claims priority, application Germany July 17, 1959
11 Claims. (Cl. 260—437)

This invention relates to a method of separating aluminum triethyl from other metal ethyl compounds and to a novel aluminum complex compound.

The invention further relates to the electrolytic production of metal ethyl compounds as being described, for example, in our co-pending applications Serial No. 548,-862, now Patent 2,985,568 and Serial No. 740,623, now Patent 3,069,334.

If, for example, sodium aluminum tetraethyl is used as the electrolyte, mixtures of the corresponding metal ethyls containing so many molecules of aluminum triethyl as corresponds to the maximum valence of the anode metal are formed at the particular anodes from the different metals. In some cases, such mixtures can be easily separated by distillation if the gap between the boiling points of the compounds to be separated is sufficiently wide. In other cases, especially with tetraethyl lead, this is impossible because the boiling points of the compounds to be separated are close together.

The problem encountered in the separation of metal ethyl compounds is solved by the process of the invention which completely eliminates the distillation of the electrolytically produced metal alkyls and especially of the tetraethyl lead which has a rather poor heat stability.

In accordance with the invention, mixtures of aluminum triethyl and a metal ethyl of groups II to V of the periodic table such as magnesium, zinc, cadmium, mercury, indium, gallium, thallium, tin, antimony, bismuth and especially lead are separated.

It is an object of this invention to provide a method of separating mixtures of these metal ethyl compounds, especially tetraethyl lead, and aluminum triethyl, which method comprises mixing the mixtures described with tri-n-butylamine and separating the addition compound of aluminum triethyl and the added amine from the other metal ethyl compounds. Adding the tri-n-butylamine mentioned above to the mixture of metal ethyl and aluminum triethyl results in the formation of triethyl aluminum-tri-n-butylaminate having the formula

$(C_2H_5)_3Al \ldots N(C_4H_9)_3$

This compound has a melting point of 30° C. Even when mixed with other metal alkyls, a major part of it crystallizes already at room temperature. This precipitation is promoted by further cooling. It becomes substantially complete when diluting the reaction mixture with a saturated hydrocarbon such as hexane, pentane, butane, liquid propane, cyclohexane, isooctane or the metal ethyl to be separated such as tetraethyl lead and then subjecting the solution to intense cooling. The amine compound of aluminum triethyl will crystallize also in this case and is then very easily separated in a manner known per se by filtration or centrifuging. The solubility of aluminum triethyl-tributyl aminate is low. With hexane as the solvent, it is in the order of magnitude of about 5% at −30° C. and of 2.5% at −60° C. Due to this favorable situation with respect to the solubility, it is very easily possible in accordance with the invention to remove from the crystals a solution of the metal alkyls in the hydrocarbon used as the solvent, which solution still contains only very little of the complex aluminum compound. This aluminum addition compound in turn can be subsequently re-decomposed so that the amine component can be used for the separation of new reaction mixtures obtained in the electrolysis while, for example, the aluminum triethyl returns into the electrolyte in an appropriate form.

To obtain a complete separation of the reaction mixture of aluminum triethyl and metal ethyl compounds primarily formed in the electrolysis, at least equivalent amounts of the amine must be added to the aluminum triethyl. It is preferred in accordance with the invention to use just the amount equivalent to aluminum triethyl.

Several methods are available for working up the solution of the metal alkyl in the hydrocarbon. It is frequently sufficient simply to distill off the hydrocarbon, preferably under vacuum, and to put the residue to further use. The very small amount of organic aluminum compound still present does not disturb as a rule. Metal alkyls which, as tetraethyl lead for example, are stable to water, can be freed from more volatile hydrocarbons by a short-time treatment with steam, in which treatment the residues of the aluminum-organic compound are destroyed and a small residual portion of tributylamine is set free. The latter is preferably eliminated with some acid after the termination of the steam treatment. The acid extracts are preferably collected and the amine can be easily recovered therefrom from time to time in usual manner within a running production of, for example, tetraethyl lead. On an overall basis, only little aluminum triethyl is lost in this method of separation and must be supplemented within a process of producing tetraethyl lead. However, this loss can be easily tolerated.

The great advantage of the method of the invention resides in the fact that, within the separation, especially of tetraethyl lead, organometallic compounds needs no longer be distilled at all. Moreover, the tributyiamine compound of aluminum triethyl is no longer spontaneously inflammable. Thus, when adding the tributyl amine directly at the outlet of the electrolytic cell, spontaneously inflammable material does no longer appear at all outside of the electrolytic cell.

*Example 1*

A mixture of 81 gms. of tetraethyl lead and 114 gms. of aluminum triethyl is slowly mixed with 185 gms. of tri-n-butylamine while stirring and cooling. The mixture thus obtained is dissolved in 1 liter of n-hexane and cooled to −60° C. whereupon aluminum triethyl-tributyl aminate crystallizes. The crystallization can be accelerated by gentle stirring. Upon completion of the crystallization, the mixture is subjected to suction filtration through a filter candle and the crystals are then washed twice with 200 ml. of hexane previously cooled to −60° C. The residue left is pure aluminum triethyl-tributyl aminate. After having distilled off 1.1 liters of hexane, cooling and crystallization are preferably repeated and the mother liquor and crystals are separated as described above. The mother liquor contains substantially all of the tetraethyl lead charged and about 4 to 5 grams of aluminum triethyl in form of the aminate.

To obtain the amine, the mother liquor is carefully mixed with 30 ml. of a 10% sulfuric acid and the lead tetraethyl is removed by steam distillation. The yield of tetraethyl lead is 100% and the loss of aluminum triethyl is 4%.

*Example 2*

In a preferred embodiment, the tetraethyl lead itself is used in place of hydrocarbons as the solvent for the mixture of tetraethyl lead-aluminum triethyl-tributyl aminate. A mixture of 81 gms. of tetraethyl lead and 299 gms. of aluminum triethyl-tributyl aminate is mixed with 300 gms.

of tetraethyl lead and cooled to —60° C. while stirring as described in Example 1. Upon crystallization of the aluminum triethyl aminate, the crystals and the mother liquor are separated. The crystals are washed with 100 ml. of hexane previously cooled to —60° C. and the washings are combined with the mother liquor. Of this mixture which contains all of the tetraethyl lead (380 gms.), 100 ml. of hexane and only traces of aluminum-organic substance, a portion which corresponds to 81 gms. of tetraethyl lead is taken off, mixed with 30 ml. of a 10% sulfuric acid to combine the small amount of amine present as aluminum triethyl aminate and subjected to steam distillation after having distilled off the small amount of hexane. The other portion can be used for a new batch.

*Example 3*

A mixture of 99 gms. of bismuth triethyl and 114 gms. of aluminum triethyl is slowly mixed with 185 gms. of tributylamine while cooling. The mixture thus obtained is dissolved in 0.5 liters of dry hexane and the solution is cooled to —60° C. whereupon the aluminum triethyl-tributyl aminate crystallizes. Upon termination of the crystallization, the mother liquor is sucked off through a glass frit introduced, and the crystals are washed with 50 ml. of hexane precooled to —60° C. There is left pure aluminum triethyl-tri-n-butyl aminate. The filtrate is a solution of bismuth triethyl in 550 ml. of hexane and, moreover, contains a small amount of aluminum-organic substance in the form of aluminum triethyl-tributyl aminate. The solution of bismuth triethyl in hexane may then be used in further batches for the separation of this metal ethyl from aluminum triethyl in place of pure hexane as used in the preceding examples. In this manner, the bismuth triethyl becomes highly concentrated so that substantially pure bismuth triethyl is being used as the diluent after several runs.

What we claim is:

1. A method of separating mixtures of aluminum triethyl and metal ethyl compounds of lead and bismuth, which comprises mixing the mixtures of ethyl compounds with tri-n-butylamine and separating the addition compound of aluminum triethyl and the added amine of the formula $Al(C_2H_5)_3 \cdot N(C_4H_9)_3$ from the other metal ethyl.

2. A method according to claim 1, wherein the amount of amine added is equivalent to the amount of aluminum triethyl present.

3. A method according to claim 1, wherein the separation of the aluminum triethyl addition compound is effected at a temperature below 30° C.

4. A method according to claim 3, wherein said separation of said addition compound is effected by crystallization at temperatures from —30° to —60° C.

5. A method according to claim 1, wherein said separation is effected in the presence of a solvent.

6. A method according to claim 5, wherein said separation is effected in the presence of a saturated hydrocarbon.

7. A method according to claim 6, wherein said hydrocarbon is a member selected from the group consisting of butane, pentane, hexane, cyclohexane and isooctane.

8. A method according to claim 5, wherein the dissolved metal ethyls separated from the addition compound are recovered by distilling off the solvent.

9. A method according to claim 8, wherein the metal ethyls obtained, as far as they are stable to water, are freed from last residues of the aluminum compound and of the amine by a short-time treatment with steam and subsequent washing with an acid.

10. A method according to claim 1, wherein the addition of said tri-n-butylamine to the mixture to be separated of aluminum triethyl and a different metal ethyl obtained by electrolysis is effected immediately upon the withdrawal of said mixture from the electrolysis apparatus.

11. A method according to claim 1, wherein a mixture of aluminum triethyl and tetraethyl lead is separated.

References Cited in the file of this patent

UNITED STATES PATENTS

| | | |
|---|---|---|
| 2,859,228 | Blitzer et al. | Nov. 4, 1958 |
| 2,923,725 | Nowlin | Feb. 2, 1960 |
| 3,048,612 | Walde | Aug. 7, 1962 |